June 26, 1923.

C. M. CONRADSON 1,459,720

ACTUATING MEANS FOR MACHINE PLATENS

Filed Oct. 24, 1919

2 Sheets-Sheet 2

INVENTOR
CONRAD M. CONRADSON
BY Paul & Paul
HIS ATTORNEYS

Patented June 26, 1923.

1,459,720

UNITED STATES PATENT OFFICE.

CONRAD M. CONRADSON, OF MADISON, WISCONSIN, ASSIGNOR TO JOSEPH T. RYERSON & SON, OF CHICAGO, ILLINOIS, A CORPORATION OF ILLINOIS.

ACTUATING MEANS FOR MACHINE PLATENS.

Application filed October 24, 1919. Serial No. 333,053.

*To all whom it may concern:*

Be it known that I, CONRAD M. CONRADSON, a citizen of the United States, resident of Madison, county of Dane, State of Wisconsin, have invented certain new and useful Improvements in Actuating Means for Machine Platens, of which the following is a specification.

My invention relates to devices for actuating platens holding work which is operated on by a relatively fixed cutting tool.

The object of my invention is to provide a platen-actuating means which will move it accurately and smoothly and in the operation of which chattering of the work will be positively prevented.

A further object is to provide an actuating mechanism in which the teeth of the gears will have longer meeting surfaces, with the greatest possible number of teeth in mesh at the same time, insuring a powerful accurate movement.

The invention consists generally in various constructions and combinations, all as hereinafter described and particularly pointed out in the claims.

Figure 1:
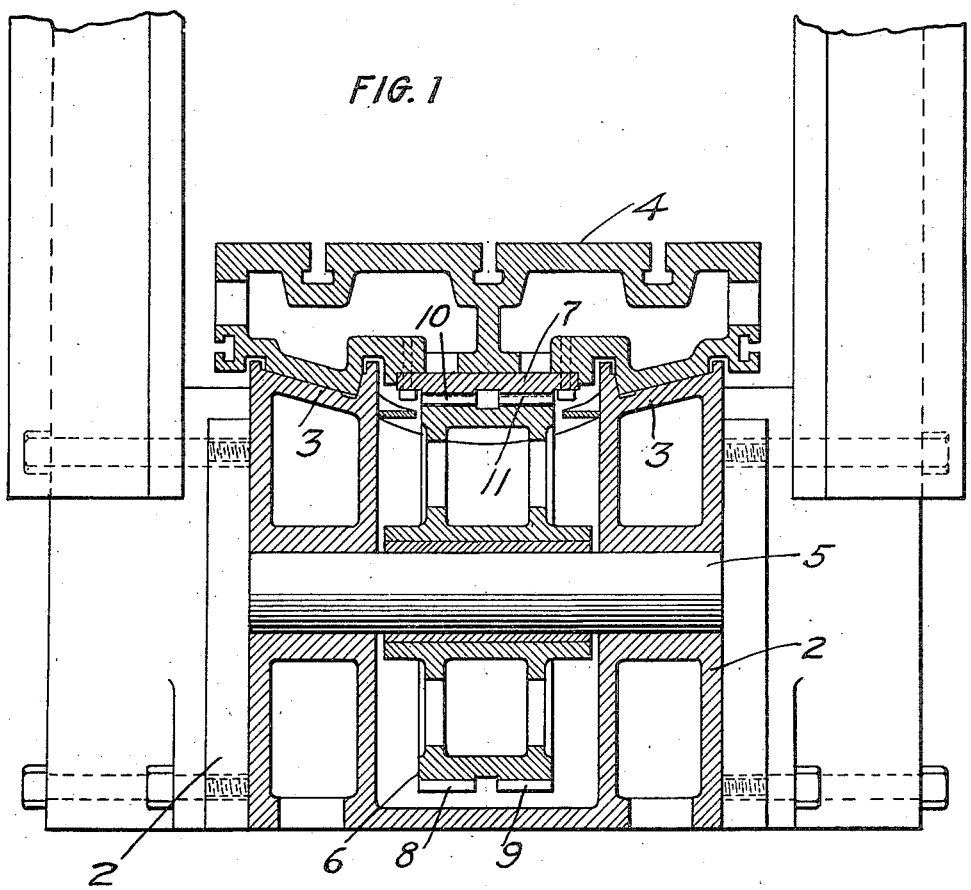
Figure 2:
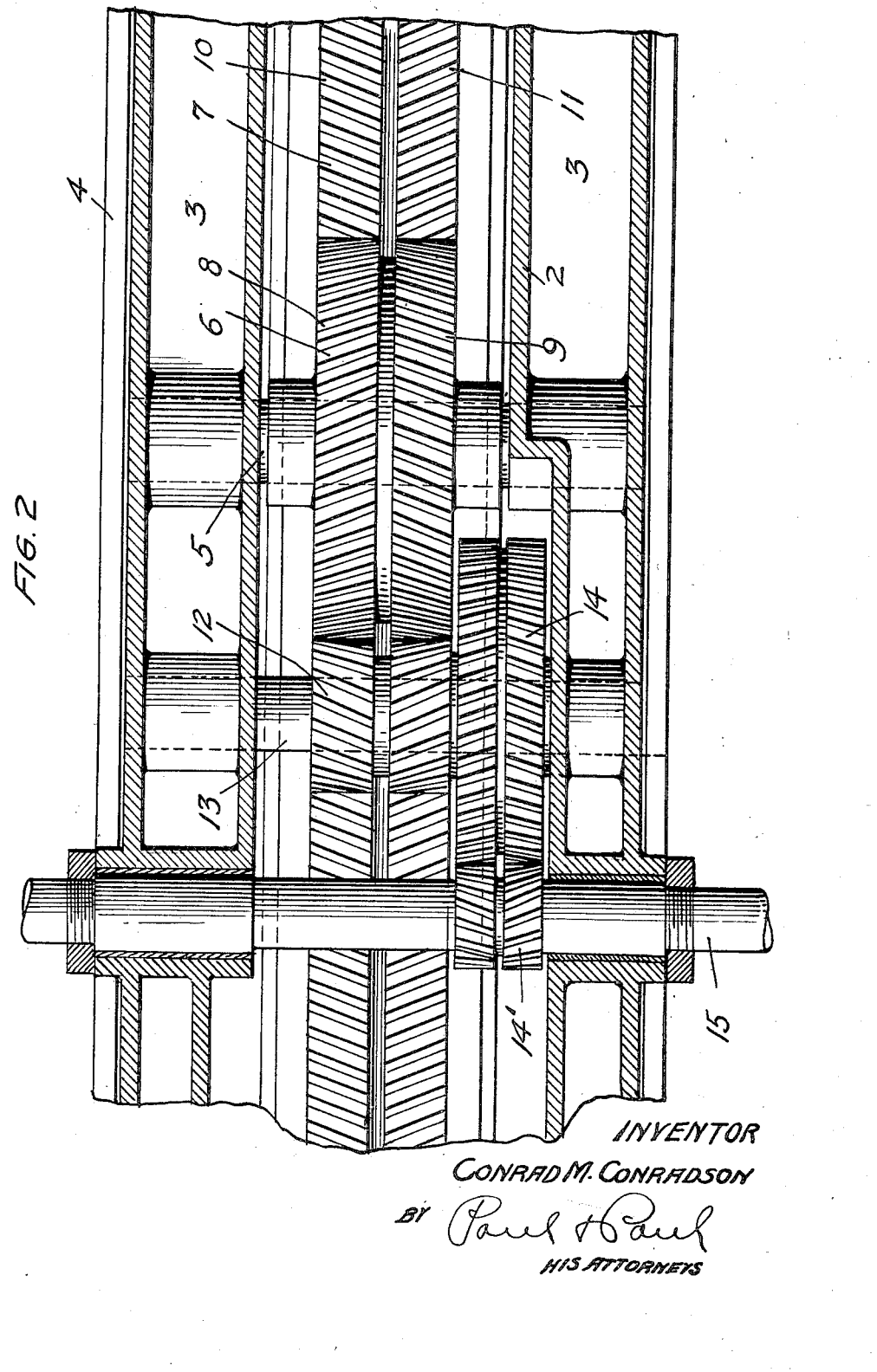

In the accompanying drawings forming part of this specification,

Figure 1 is a vertical sectional view through the bed and frame of a planer, with my invention applied thereto, Figure 2 is a view of the herringbone bull gear and rack, looking from the underside of the platen.

In the drawing, 2 represents the frame of planer, 3 the guideways on which the platen or table 4 is mounted to reciprocate. 5 is a shaft mounted in the frame and 6 is a bull gear mounted to revolve on the shaft 5 and having teeth to mesh with the rack 7 that is secured to the underside of the platen. This bull gear is of the herringbone type—that is, it is provided with teeth 8 and 9 arranged in groups upon opposite sides of its vertical axis, those on one side being at an angle or obliquely arranged with respect to the corresponding teeth on the other side, and the rack has teeth 10 and 11 correspondingly arranged to mesh with the teeth of the gear. The teeth on one side of the vertical axis of the gear and rack are in staggered relation to the teeth on the other side of the vertical axis of said gear and rack. This arrangement of the teeth insures a driving engagement of the greatest possible number of them and at the same time provides a longer bearing surface than usual in driving gears and prevents to a large degree lost motion and wear in the driving mechanism incidental to machines of this kind, as usually constructed. Rack teeth made in this way are stronger, as the strain is applied obliquely thereto instead of at right angles, as in an ordinary gear. The oblique arrangement of the teeth also prevents relative lateral movement of the gear and rack and makes the mechanism practically noiseless.

The herringbone bull gear preferably meshes with a driving pinion 12 on a shaft 13 which is in turn driven through a herringbone gear 14 and pinion 14' from the shaft 15 connected with a suitable source of power. I have found from actual construction and test of a machine platen driven in this way that the movement will be silent, continuous and powerful, and all chatter will be eliminated and smooth, accurate work insured.

I claim as my invention:

1. The combination of a frame having double walls and long journal bearings therethrough and oppositely inclined runways, a reciprocating platen having a base extending over the runways with oppositely inclined surfaces fitting those of the frame runways, a rack between the runways rigidly secured to the platen and a bull wheel having its axis journaled at both ends in said journal bearings and having sets of oppositely inclined cogs the cogs of one set being staggered relatively to the cogs of the other set and corresponding sets of cogs on the platen rack to intermesh with those on the wheel, herring bone gearing also journaled between the frame walls for driving the bull wheel whereby wear between the surfaces is taken up and chatter between the gearing and the rack is prevented.

2. The combination of a frame having double walls and long journal bearings and oppositely inclined runways with substantially perpendicular sides, of a reciprocating platen having a base extending over the runways with oppositely inclined and substantially perpendicular surfaces fitting those of the frame runways, a rack between the runways rigidly secured to the platen, and a bull wheel journaled in the frame and having sets of oppositely inclined cogs with a groove between the sets of cogs, the cogs of one set being staggered relatively to the cogs of the other set, and corresponding sets of cogs on the platen rack with a groove between the sets of cogs to intermesh with those on the wheel, herringbone gearing also journaled between the frame walls for driving the bull wheel whereby wear between the surfaces is taken up and chatter between the gearing and the rack is prevented.

In witness whereof, I have hereunto set my hand this 17th day of October, 1919.

CONRAD M. CONRADSON.

Witnesses:
B. L. PARKER,
ALICE M. HAWLEY.